(12) United States Patent
Reinhardt et al.

(10) Patent No.: US 7,308,607 B2
(45) Date of Patent: Dec. 11, 2007

(54) PERIODIC CHECKPOINTING IN A REDUNDANTLY MULTI-THREADED ARCHITECTURE

(75) Inventors: Steven K. Reinhardt, Vancouver, WA (US); Shubhendu S. Mukherjee, Framingham, MA (US); Joel S. Emer, Acton, MA (US)

(73) Assignee: Intel Corporation, Santa Clara, CA (US)

( * ) Notice: Subject to any disclaimer, the term of this patent is extended or adjusted under 35 U.S.C. 154(b) by 526 days.

(21) Appl. No.: 10/651,388

(22) Filed: Aug. 29, 2003

(65) Prior Publication Data

US 2005/0050307 A1    Mar. 3, 2005

(51) Int. Cl.
*G06F 11/00*   (2006.01)
(52) U.S. Cl. .............................. 714/25; 714/10; 714/11; 714/15; 714/728
(58) Field of Classification Search ................. 714/10, 714/11, 15, 727
See application file for complete search history.

(56) References Cited

U.S. PATENT DOCUMENTS

| | | | |
|---|---|---|---|
| 5,938,775 A | | 8/1999 | Damani et al. |
| 6,023,772 A | | 2/2000 | Fleming |
| 6,052,808 A | * | 4/2000 | Wu et al. .................... 714/727 |
| 6,058,491 A | * | 5/2000 | Bossen et al. ................. 714/15 |
| 6,317,821 B1 | * | 11/2001 | Batten et al. ................ 712/200 |
| 6,326,809 B1 | | 12/2001 | Gambles et al. |
| 6,519,730 B1 | | 2/2003 | Ando et al. |
| 6,598,122 B2 | | 7/2003 | Mukherjee et al. |
| 2001/0034854 A1 | | 10/2001 | Mukherjee |

OTHER PUBLICATIONS

Haitham Akkary, Michael A. Driscoll, "A Dynamic Multithreading Processor," Proceedings of the 31st Annual International Symposium on Microarhitecture, Nov. 30-Dec. 2, 1998, pp. 1-11, Dallas, Texas, USA.
Seon Wook Kim, et al., "Reference Idempotency Analysis: A Framework for Optimizing Speculative Execution," Proceedings of the SIGPLAN Symposium on Principals and Practice of Parallel Programming (PPoPP), Jun. 18-20, 2001, pp. 1-10, Snowbird, Utah, USA.
Deborah T. Marr, et al., "Hyper-Threading Technology Architecture and Microarchitecture," Intel Technology Journal Q1, 2002, pp. 1-12.
Shubhendu S. Mukherjee, et al., "Detailed Design and Evaluation of Redundant Multithreading Alternatives," 29th Annual International Symposium on Computer Architecture (ISCA), 2002, pp. 1-12.
Steven K. Reinhardt, Shubhendu S. Mukherjee, "Transient Fault Detection via Simultaneous Multithreading," 27th Annual International Symposium on Computer Architecture, Jun. 2000, pp. 1-12.

(Continued)

*Primary Examiner*—Robert Beausoliel
*Assistant Examiner*—Charles Ehne
(74) *Attorney, Agent, or Firm*—Blakely, Sokoloff, Taylor & Zafman LLP

(57) ABSTRACT

A multithreaded architecture having one or more checker circuits that operate on store operations that send data outside of a sphere of replication. Fault detection mechanisms used to check outputs from the sphere of replication are reused for checkpointing at the conclusion of an execution epoch.

40 Claims, 9 Drawing Sheets

OTHER PUBLICATIONS

Kasbekar, Mangesh, et al., "Selective Checkpointing and Rollbacks in Multithreaded Distributed Systems", IEEE, ISSN: 0018-9529; vol. 48, Issue 4, Dec. 1999, pp. 325-337.

Le, Dieu M., "42P15451 Final Office Action mailed Feb. 28, 2007."

Shaw, Viral, et al., "Fault Propagation Analysis Based Variable Length Checkpoint Placement for Fault-Tolerant Parallel and Distributed Systems", IEEE, INSPEC No. 5698225; Aug. 13-15, 1997, pp. 612-615.

* cited by examiner

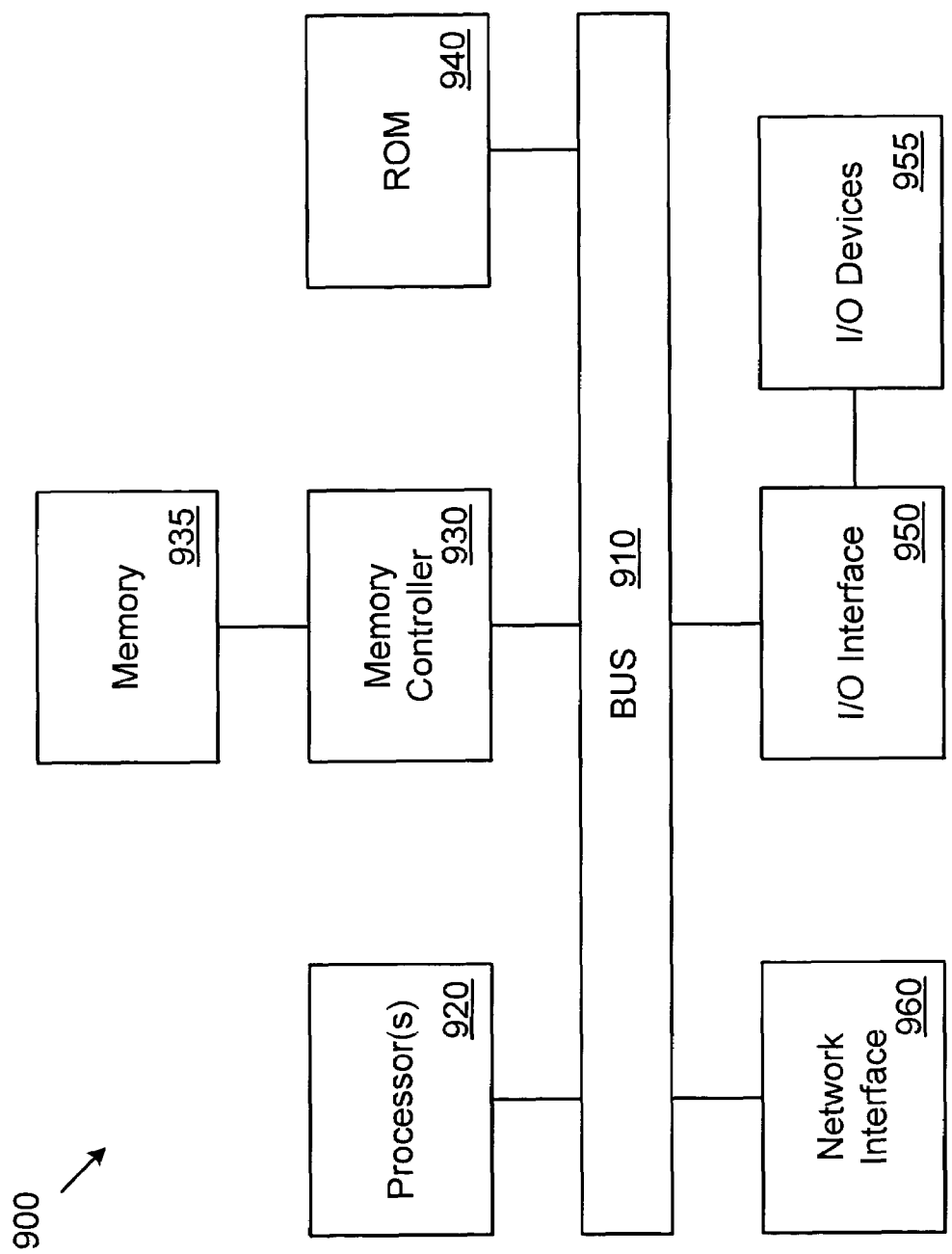

PERIODIC CHECKPOINTING IN A REDUNDANTLY MULTI-THREADED ARCHITECTURE

RELATED APPLICATIONS

This U.S. Patent application is related to the following U.S. Patent applications:

(1) INCREMENTAL CHECKPOINTING IN A MULTI-THREADED ARCHITECTURE, application Ser. No. 10/651,376 filed Aug. 29, 2003; and (2) HARDWARE RECOVERY IN A MULTI-THREADED ARCHITECTURE, application Ser. No. 10/651,523, filed Aug. 29, 2003.

TECHNICAL FIELD

The invention relates to multi-threaded computing architectures. More specifically, the invention relates to devices and techniques for incremental, periodic storage of checkpoints in a multi-threaded computing architecture.

BACKGROUND

Processors are becoming increasingly vulnerable to transient faults caused by alpha particle and cosmic ray strikes. These faults may lead to operational errors referred to as "soft" errors because these errors do not result in permanent malfunction of the processor. Strikes by cosmic ray particles, such as neutrons, are particularly critical because of the absence of practical protection for the processor. Transient faults currently account for over 90% of faults in processor-based devices.

As transistors shrink in size the individual transistors become less vulnerable to cosmic ray strikes. However, decreasing voltage levels that accompany decreasing transistor sizes and the corresponding increase in transistor count results in an exponential increase in overall processor susceptibility to cosmic ray strikes or other causes of soft errors. To compound the problem, achieving a selected failure rate for a multi-processor system requires an even lower failure rate for the individual processors. As a result of these trends, fault detection and recovery techniques, currently reserved for mission-critical applications, are becoming increasing applicable to other processor applications.

Several terms are commonly used when discussing processor errors and error recovery. A Failure in Time (FIT) refers to an error rate of one failure in one billion ($10^9$) hours. Mean Time Between Failure (MTBF) is the time between failures caused by soft errors. MTBF requirements are typically expressed in years. For example, one FIT equals a MTBF of 114,155 years:

$$114,155 = \frac{10^9}{(24*365)}.$$

Silent Data Corruption (SDC) occurs when errors are not detected and may result in corrupted data values the can persist until the processor is reset. The SDC Rate is the rate at which SDC events occur. Detected, unrecoverable errors (DUE) are errors that are detected, for example, by using parity checking, but cannot be corrected. The rate of these errors is referred to as the DUE rate.

For example, publicly available documents from IBM specify 25 years MTBF for DUE and 1000 years MTBF for SDC. These specifications are for single-processor systems. Application to a multi-processor system results in more stringent specifications for individual processors. It is becoming increasingly difficult to meet SDC and DUE FIT specifications because the neutron FIT contribution of latches is increasing. Other components, for example, most SRAM cells, either can be protected via interleaved parity or error correcting codes or do not provide significant contribution to the overall FIT rate.

The FIT rate of latches consists of two parts: the raw FIT rate and a derating factor. The raw FIT rate can be computed using circuit models and currently ranges between 0.001 and 0.01 per latch. The derating factor is the fraction of faults that lead to errors. Typically, the derating factor is 10%. Using the specifications set forth above as a further example, in a 64-processor system, each processor can have only approximately 1,800 latches. However, designing a complex, high-performance processor core with only 1,800 latches is extremely difficult.

Fault detection support can reduce a processor's SDC rate by halting computation before faults can propagate to permanent storage. Parity, for example, is a well-known fault detection mechanism that avoids silent data corruption for single-bit errors in memory structures. Adding parity to latches or logic in high-performance processors can adversely affect the cycle time and overall performance. Consequently, processor designers have resorted to redundant execution mechanisms to detect faults.

Current redundant-execution systems commonly employ a technique known as "lockstepping" that detects processor faults by running identical copies of the same program on two identical lockstepped (cycle-synchronized) processors. In each cycle, both processors are fed identical inputs and a checker circuit compares the outputs. On an output mismatch, the checker flags an error and can initiate a recovery sequence. Lockstepping can reduce a processor's SDC FIT by detecting each fault that manifests at the checker. Lockstepping wastes processor resources that could otherwise be used to improve performance.

BRIEF DESCRIPTION OF THE DRAWINGS

The invention is illustrated by way of example, and not by way of limitation, in the figures of the accompanying drawings in which like reference numerals refer to similar elements.

FIG. 9 is a block diagram of an electronic system that can provide an environment for multithreaded processors.

DETAILED DESCRIPTION

Methods and apparatuses for periodic checkpointing in a multi-threaded environment are described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

In one embodiment, a redundant multithreaded (RMT) system provides fault detection in a more efficient manner than traditional techniques such as lockstepping. The RMT processor detects hardware faults by running two copies of the same thread with identical inputs and comparing the outputs for mismatches. By making the domain of checking the processor, the outputs of the processors, for example, memory writes (address and data) are checked.

Transparent hardware recovery requires a fault-free checkpointed state of the system so that on an error the processor can reload the fault-free state and repeat execution. In one embodiment, the checkpointed state of a system includes both architectural register values and memory. The checkpoint consists of a copy of the architectural register file values at the time the checkpoint is generated. In one embodiment, checkpointing also includes an ordered log of responses from memory so that the responses can be repeated to simulate a complete checkpoint of the memory.

Described in greater detail below are techniques for periodic checkpointing of the architectural register file and logs of external (to the processors) inputs, such as load values, to allow transparent recovery from an error. When a processor detects an error on a store instruction (e.g., via an output comparison mechanism), the processor reloads the state from the last checkpoint, repeats the external inputs from the log, but suppresses outputs to memory because those outputs have been previously committed. In one embodiment, this technique uses a log of external inputs to decouple the committing of output values from register checkpointing, allowing higher performance and uses input replication mechanisms to serve as the log of external inputs.

Sphere of Replication

Figure 1:
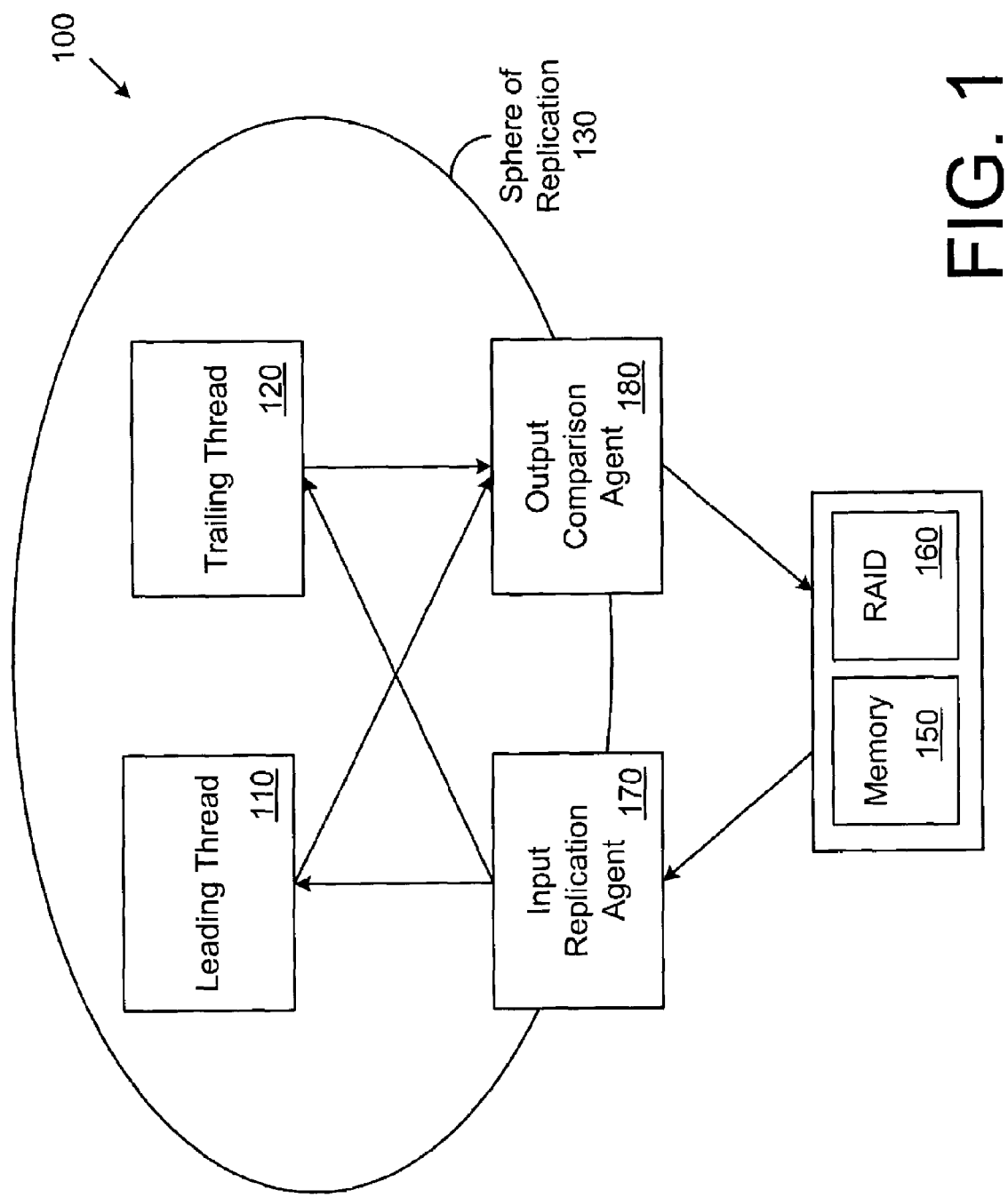
FIG. 1 is a block diagram of one embodiment of a multithreaded architecture.

FIG. 1 is a block diagram of one embodiment of a redundantly multithreaded architecture. In a redundantly multithreaded architecture faults can be detected by executing two copies of a program as separate threads. Each thread is provided with identical inputs and the outputs are compared to determined whether an error has occurred. Redundant multithreading can be described with respect to a concept referred to herein as the "sphere of replication." The sphere of replication is the boundary of logically or physically redundant operation.

Components within sphere of replication 130 (e.g., a processor executing leading thread 110 and a processor executing trailing thread 120) are subject to redundant execution. In contrast, components outside sphere of replication 130 (e.g., memory 150, RAID 160) are not subject to redundant execution. Fault protection is provide by other techniques, for example, error correcting code for memory 150 and parity for RAID 160. Other devices can be outside of sphere of replication 130 and/or other techniques can be used to provide fault protection for devices outside of sphere of replication 130.

Data entering sphere of replication 130 enter through input replication agent 170 that replicates the data and sends a copy of the data to leading thread 110 and to trailing thread 120. Similarly, data exiting sphere of replication 130 exit through output comparison agent 180 that compares the data and determines whether an error has occurred. Varying the boundary of sphere of replication 130 results in a performance versus amount of hardware tradeoff. For example, replicating memory 150 would allow faster access to memory by avoiding output comparison of store instructions, but would increase system cost by doubling the amount of memory in the system.

In general, there are two spheres of replication, which can be referred to as "SoR-register" and "SoR-cache." In the SoR-register architecture, the register file and caches are outside the sphere of replication. Outputs from the SoR-register sphere of replication include register writes and store address and data, which are compared for faults. In the SoR-cache architecture, the instruction and data caches are outside the sphere of replication, so all store addresses and data, but not register writes, are compared for faults. The SoR-cache architecture has the advantage that only stores (and possibly a few other selected instructions) are compared for faults, which reduces checker bandwidth and improves performance by not delaying the store operations. In contrast, the SoR-register architecture requires comparing most instructions for faults, which requires greater checker bandwidth and can delay store operations until the checker determines that all instructions prior to the store operation are fault-free. The SoR-cache can provide the same level of fault coverage as SoR-register because faults that do not manifest as errors at the boundary of the sphere of replication do not corrupt the system state, and therefore, are effectively masked.

In order to provide fault recovery, each instruction result should be compared to provide a checkpoint corresponding to every instruction. Accordingly, the SoR-register architecture is described in greater detail herein.

Overview of Simultaneous and Redundantly Threaded Architecture

Figure 2:
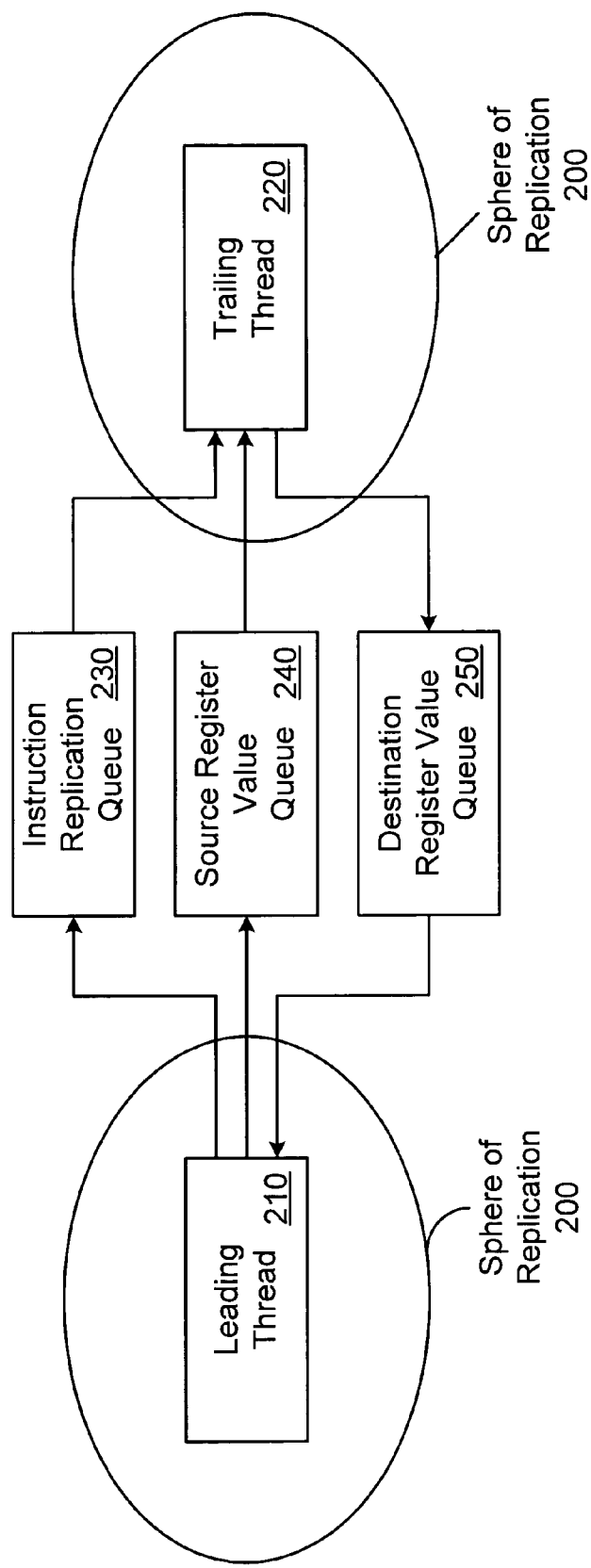
FIG. 2 is a block diagram of one embodiment of a simultaneous and redundantly threaded architecture.

FIG. 2 is a block diagram of one embodiment of a simultaneous and redundantly threaded architecture. The architecture of FIG. 2 is a SoR-register architecture in which the output, or result, from each instruction is compared to detect errors.

Leading thread 210 and trailing thread 220 represent corresponding threads that are executed with a time differential so that leading thread 210 executes instructions before trailing thread 220 executes the same instruction. In one embodiment, leading thread 210 and trailing thread 220 are identical. Alternatively, leading thread 210 and/or trailing thread 220 can include control or other information that is not included in the counterpart thread. Leading thread 210 and trailing thread 220 can be executed by the same processor or leading thread 210 and trailing thread 220 can be executed by different processors.

Instruction addresses are passed from leading thread 210 to trailing thread 220 via instruction replication queue 230. Passing the instructions through instruction replication queue 230 allows control over the time differential or "slack" between execution of an instruction in leading thread 210 and execution of the same instruction in trailing thread 220.

Input data are passed from leading thread 210 to trailing thread 220 through source register value queue 240. In one embodiment, source register value queue 240 replicates input data for both leading thread 210 and trailing thread 220. Output data are passed from trailing thread 220 to leading thread 210 through destination register value queue 250. In one embodiment, destination register value queue 250 compares output data from both leading thread 210 and trailing thread 220.

In one embodiment, leading thread 210 runs hundreds of instructions ahead of trailing thread 220. Any number of instructions of "slack" can be used. In one embodiment, the slack is caused by slowing and/or delaying the instruction fetch of trailing thread 220. In an alternate embodiment, the slack can be caused by instruction replication queue 230 or an instruction replication mechanism, if instruction replication is not performed by instruction replication queue 230.

Further details for techniques for causing slack in a simultaneous and redundantly threaded architecture can be found in "Detailed Design and Evaluation of Redundant Multithreading Alternatives," by Shubhendu S. Mukhejee, Michael Kontz and Steven K. Reinhardt in *Proc. 29$^{th}$ Int'l Symp. on Computer Architecture*, May 2002 and in "Transient Fault Detection via Simultaneous Multithreading," by Steven K. Reinhardt and Shubhendu S. Mukherjee, in *Proc. 27$^{th}$ Int'l Symp. on Computer Architecture*, June 2000.

Overview of Chip-Level Redundantly Threaded Architecture

Figure 3:
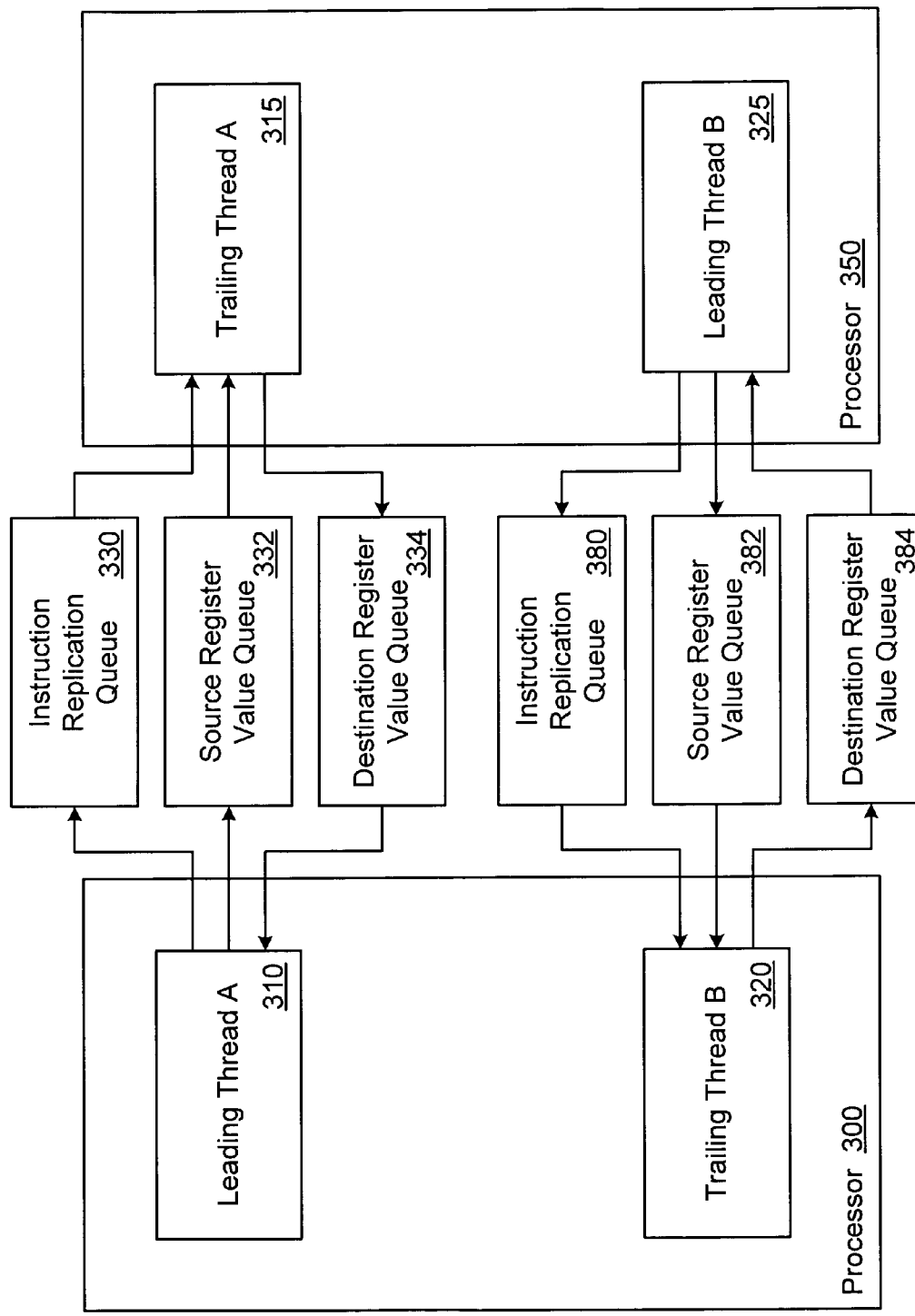
FIG. 3 is a block diagram of one embodiment of a chip-level redundantly threaded architecture.

FIG. 3 is a block diagram of one embodiment of a chip-level redundantly threaded (CRT) architecture. As with the SRT architecture described above, the CRT architecture executes loosely synchronized redundant threads, which enable lower checker overhead and reduces or eliminates cache miss and misspeculation penalties in the trailing thread. As in lockstepping, the two redundant thread copies execute on separate processor cores. That is, the two redundant threads are not multiplexed as different thread contexts on a single processor core as in the SRT architecture. This allows the CRT architecture to provide the same transient and permanent fault protection as lockstepping.

Leading thread 310 executed by processor 300 and trailing thread 315 executed by processor 350 represent a first set of corresponding threads (Thread A) that are executed with a time differential so that leading thread 310 executes instructions before trailing thread 315 executes the corresponding instruction. Similarly, leading thread 325 executed by processor 350 and trailing thread 320 executed by processor 300 represent a second set of corresponding threads (Thread B) that are executed with a time differential so that leading thread 325 executes instructions before trailing thread 320 executes the corresponding instruction.

Instructions to be executed by trailing thread 315 are passed from leading thread 310 to trailing thread 315 through instruction replication queue 330. Input data are passed from leading thread 310 executed by processor 300 to trailing thread 315 executed by processor 350 through source register value queue 332. In one embodiment, source register value queue 332 replicates input data for both leading thread 310 and trailing thread 315. Output data are passed from trailing thread 315 to leading thread 310 through destination register value queue 334. In one embodiment, destination register value queue 334 compares output data from both leading thread 310 and trailing thread 315.

Instructions to be executed by trailing thread 320 are passed from leading thread 325 to trailing thread 320 through instruction replication queue 380. Input data are passed from leading thread 325 executed by processor 350 to trailing thread 320 executed by processor 300 through source register value queue 382. In one embodiment, source register value queue 382 replicates input data for both leading thread 325 and trailing thread 320. Output data are passed from trailing thread 320 to leading thread 320 through destination register value queue 384. In one embodiment, destination register value queue 384 compares output data from both leading thread 320 and trailing thread 325.

Instruction queues 330 and 380, source register value queues 332 and 382, and destination register queues 334 and 384 are illustrated as outside of processors 300 and 350 to indicate the independent nature of physical queue placement. The queues illustrated in FIG. 3 can be implemented in processor 300, in processor 350 or in both processor 300 and processor 350.

When executing single-thread workloads, the CRT architecture performs similarly to lockstepping because the behavior of the leading thread is similar to that of the individual thread in a lockstepped processor. However, with multithreaded workloads, the CRT architecture "cross-couples" the processor cores to increase efficiency and provide improved performance as compared to lockstepping. For example, with two application threads, each core runs the leading thread for one application and the trailing thread for the other application. The resources freed by the CRT architecture on each core from optimizing execution of the trailing thread are then available for the more resource-intensive leading thread execution.

Figure 4:
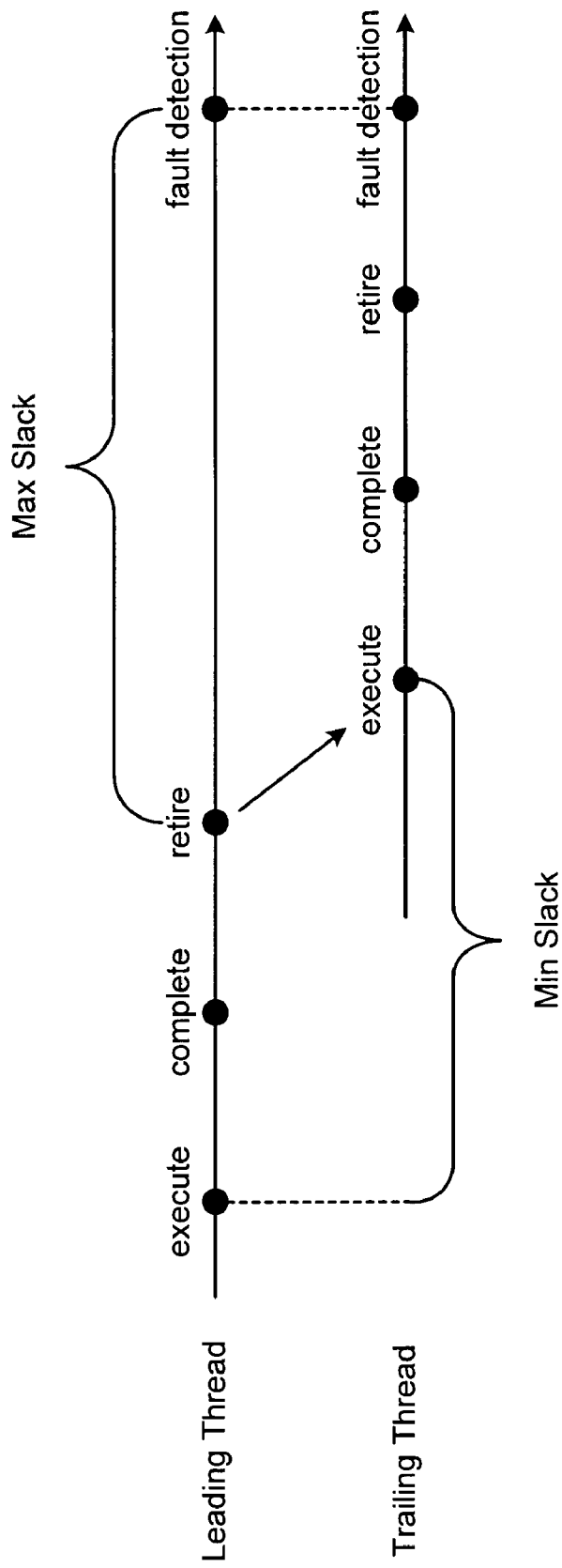
FIG. 4 illustrates minimum and maximum slack relationships for one embodiment of a simultaneous and redundantly threaded architecture.

FIG. 4 illustrates minimum and maximum slack relationships for one embodiment of a simultaneous and redundantly threaded architecture. The embodiment of FIG. 4 is a SoR-register architecture as described above. The minimum slack is the total latency of a cache miss, latency from execute to retire, and latency incurred to forward the load address and value to the trailing thread. If the leading thread suffers a cache miss and the corresponding load from the trailing thread arrives at the execution point before the minimum slack, the trailing thread is stalled.

Similarly, the maximum slack is latency from retire to fault detection in the leading thread. In general, there is a certain amount of buffering to allow retired instructions from the leading thread to remain in the processor after retirement. This defines the maximum slack between the leading and trailing threads. If the buffer fills, the leading thread is stalled to allow the trailing thread to consume additional instructions from the buffer. Thus, if the slack between the two threads is greater than the maximum slack, the overall performance is degraded.

Overview of Checkpointing and Backward Recovery

One fault-recovery technique, referred to as "backward recovery" involves restoring a system (e.g., a processor, a computer system) to an earlier fault-free state and re-executing a thread from the restoration point. A copy of the earlier state that can be restored is referred to as a "checkpoint." Backward recovery includes two issues to be addressed to provide transparent recovery: non-deterministic events and regenerated outputs.

If a non-deterministic event (e.g., an asynchronous interrupt) occurs after the last checkpoint re-execution after a fault may not follow the same path as the original execution. Specifically, if an externally visible output (e.g., a store) was generated along the original execution path prior to the fault, but the re-execution follows a different path that generates a different output, the resulting sequence of outputs, as observed from a reference external to the system, will not be consistent with fault-free execution and recovery will not be transparent. To prevent this occurrence, a backward recovery system must guarantee at each output operation that any subsequent fault-induced rollback will follow the same execution path up to the point of the output. This is referred to as the "output commit" problem.

Even if the re-execution deterministically follows the same path as the original execution, any externally visible output operations after the last checkpoint will be performed again during re-execution. If these output operations are not idempotent, then the re-execution will lead to behavior inconsistent with a fault-free execution and recovery will not be transparent.

One solution to both issues (non-deterministic events and regenerated outputs) is to create a new checkpoint automatically with each output operation. The checkpoint then incorporates any non-deterministic events that may have led to the execution of that output operation. If the output operation completes successfully, then any subsequent fault will roll back to the execution point after that operation and the output operation will not be re-executed.

Overview of Log-Based Recovery

In general, log-based recovery decouples the fault detection point from the checkpoint validation. This decoupling allows a performance advantage of the RMT architecture while also providing transparent hardware recovery that improves the SER FIT of a processor.

Log-based recovery applies to a system that is piecewise deterministic (i.e., a system in which execution consists of deterministic intervals separated by non-deterministic events). An event is considered non-deterministic if execution of the event is not determined entirely by the state inside the system. The state of a piecewise deterministic system at any point can be recreated given an initial condition and a complete description of all non-deterministic events up to the desired point.

Figure 5:
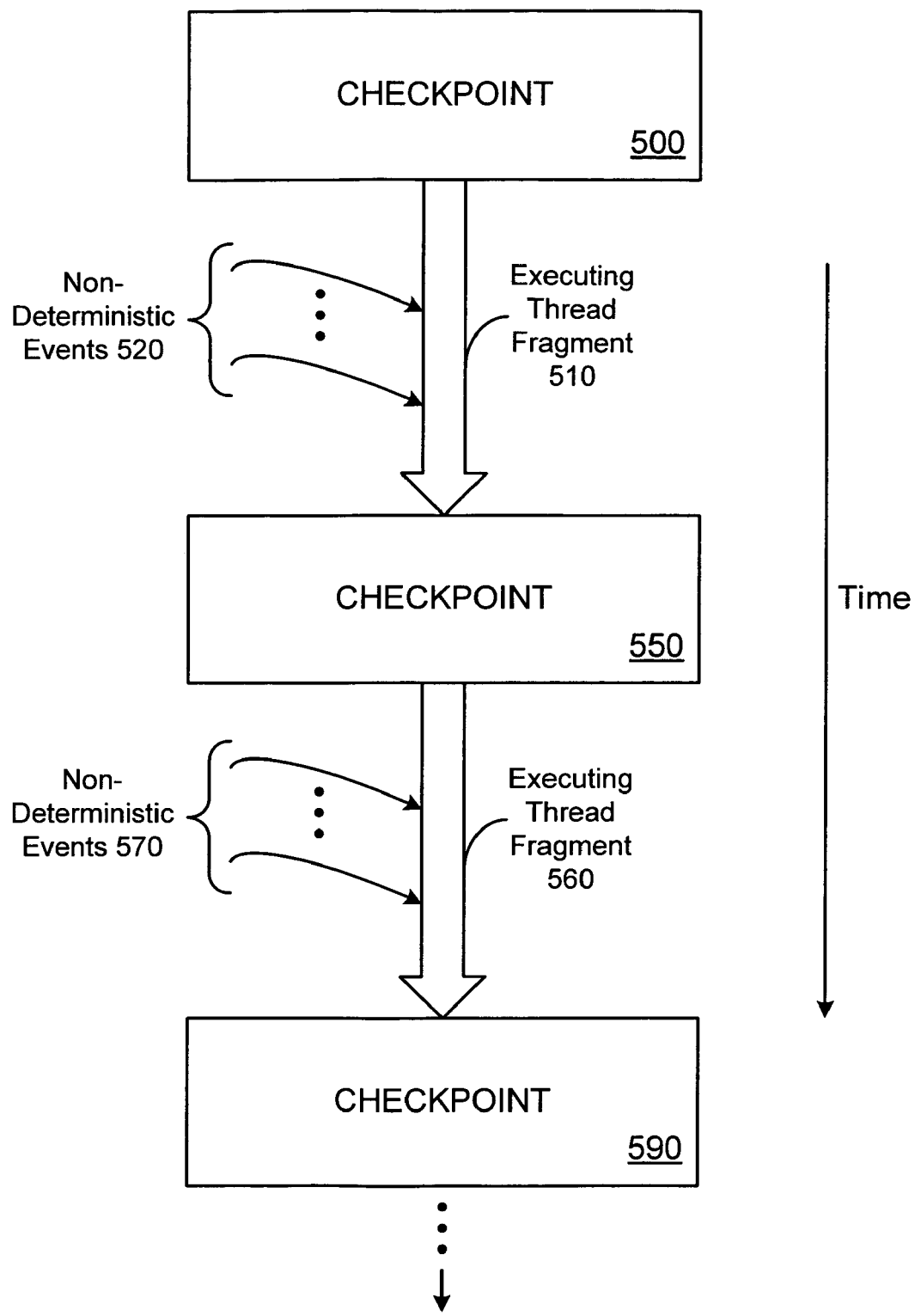
FIG. 5 is a conceptual flow of a piecewise deterministic system.

FIG. 5 is a conceptual flow of a piecewise deterministic system. Checkpoint 500 corresponds to a point in execution of a thread at which a copy of the architectural register file values is stored. In the description of FIG. 5, the instructions of a thread that are executed between checkpoints are referred to as "fragments." For example, executing thread fragment 510 represents the instructions executed between the time of checkpoint 500 and checkpoint 550 and executing thread fragment 560 represents the instructions executed between the time of checkpoint 550 and checkpoint 590.

During the time between checkpoint 500 and checkpoint 550 one or more non-deterministic events 520 occur. Non-deterministic events 520 are recorded until the time of checkpoint 550 for potential recovery purposes. During the time between checkpoint 550 and checkpoint 590 non-deterministic events 570 occur and are recorded for potential recovery purposes. At the time of checkpoint 550, the recorded non-deterministic events 520 are no longer required because checkpoint 550 corresponds to a storage of the complete architectural state at the corresponding time.

In one embodiment, the non-deterministic events are stored in a log that sequentially records the non-deterministic events. When fault recovery is required, the most recent checkpoint is restored and the non-deterministic events are re-executed to determine the correct state. As described above, a non-deterministic event is an event where execution is not determined entirely within the system (e.g., the sphere of replication to which the executing processor belongs). Non-deterministic events include, for example, load operations (e.g., memory contents modified external to the sphere of the processor), interrupts (e.g., asynchronous interrupts), or timing-dependent operations (e.g., read operations to on-chip cycle counters).

The non-deterministic events are maintained in order to provide determinism between the leading and trailing threads. When execution is deterministic, both threads follow the same execution path and capture of the non-deterministic events allows the threads to maintain consistency. Thus, the log, or record, of non-deterministic events between checkpoints can be used for error recovery.

In order to support error recovery, the checkpoint and the log of non-deterministic events must be fault free and protected against transient faults (e.g., by ECC). After completion and fault-free validation of a checkpoint, the previous checkpoint and any logged non-deterministic events prior to the current checkpoint can be discarded. Checkpoint frequency can be based on, for example, the available log storage and/or recovery latency.

As discussed above, the RMT architecture provides fault detection based on the SoR-cache architecture. When checkpoints are created the are checked for faults. In one embodiment, all new register values from the two redundant threads are compared for a mismatch. In the absence of a mismatch, the register values can be sent to fault-protected (e.g., ECC-protected) checkpoint storage.

The log of non-deterministic events, for example, loads and asynchronous interrupts, allows the architectural state of the processor at the point a fault is detected to be reproduced starting from the last checkpoint, regardless of the time that has passed since the checkpoint. This decouples the fault detection in SoR-cache (used to verify data sent from the processor) from fault detection in SoR-register (used to validate checkpoints) because outputs (e.g., stores) can be committed externally without creating a full, validated checkpoint at the time of the output. Consequently, checkpoint validation is not in the critical path of program execution and, therefore, can be performed as a background operation. Also, checkpoints are not required for every output, which decreases the frequency of checkpoint storage.

During regular execution, outputs from the leading and trailing threads are compared to determine whether an output mismatch has occurred. An output mismatch for data exiting the SoR-cache (e.g., in a store address or value) indicates the presence of a fault.

In response to the fault, both the leading and trailing thread contexts are flushed because detection of the thread does not indicate which thread caused the fault. Contexts for both threads is reloaded from the most recent checkpoint. The contexts, or architectural state, corresponding to a check point can be restored from a memory that stores the most recent checkpoint.

Thread processing for both the leading and trailing thread resumes in recovery mode in which both threads are driven by the logged non-deterministic events. Inputs to the trailing thread are the same for normal operation and recovery. The leading thread is temporarily supplied by the logged non-deterministic events until the execution point at which the fault occurred. In one embodiment, the fault point is determined by maintaining a counter that tracks the number of outputs generated since the previous checkpoint. During recovery, the counter is decremented for each output generated until the count reaches zero. Other techniques for determining the fault point can also be used. During recovery regenerated outputs are discarded because those outputs have already been exposed outside of the SoR-cache.

Checkpoint creation may occur either continuously as a background operation or at periodic intervals. Register values from both threads are compared for mismatches. In the absence of a mismatch the outputs are committed to external checkpoint storage.

If a mismatch occurs, both thread contexts are flushed. Contexts for both threads are reloaded from the most recent checkpoint. Thread processing for both the leading and trailing thread resumes in recovery mode in which both threads are driven by the logged non-deterministic events. During recovery regenerated outputs are discarded. The external checkpoint storage must be capable of storing a full valid checkpoint until a subsequent checkpoint can be fully validated.

Faults can also occur during the recovery procedure. In one embodiment, to detect these faults, the outputs of both threads that leave the SoR-cache are compared. In one embodiment, a detected fault during recovery can imply a permanent fault, which is flagged for action by the operating system. Alternatively, both threads can be restarted (e.g., a second time) from the checkpoint with input provided from the event log as described above.

Improved Periodic Checkpointing with Log-Based Recovery

As described above, a fault-free checkpoint is used to recover from hardware faults. Data associated with a checkpoint to be used for recovery purposes must be created and validated as well as protected (e.g., ECC protection) after being created. Use of the log described above allows a processor to avoid incremental checkpointing (i.e., checking the output of both threads after each instruction is executed). However, checkpoints must be created periodically for fault recovery purposes. In one embodiment, checkpoints are generated at predetermined intervals and stored in a memory external to the processor. The predetermined intervals can be, for example, a designated period of time, a designated number of instructions, the existence of one or more designated conditions, etc.

Periodic checkpointing incurs overhead both in terms of performance loss and additional hardware in the form of a checkpoint checker circuit. Performance loss arises from periodically copying processor registers to an external memory via checker circuitry to store data required for a checkpoint. The additional checker hardware must also be protected from faults. Described in greater detail below is a technique to reduce performance loss from periodic checkpoint storage and elimination of the checkpoint checker circuit.

Figure 6:
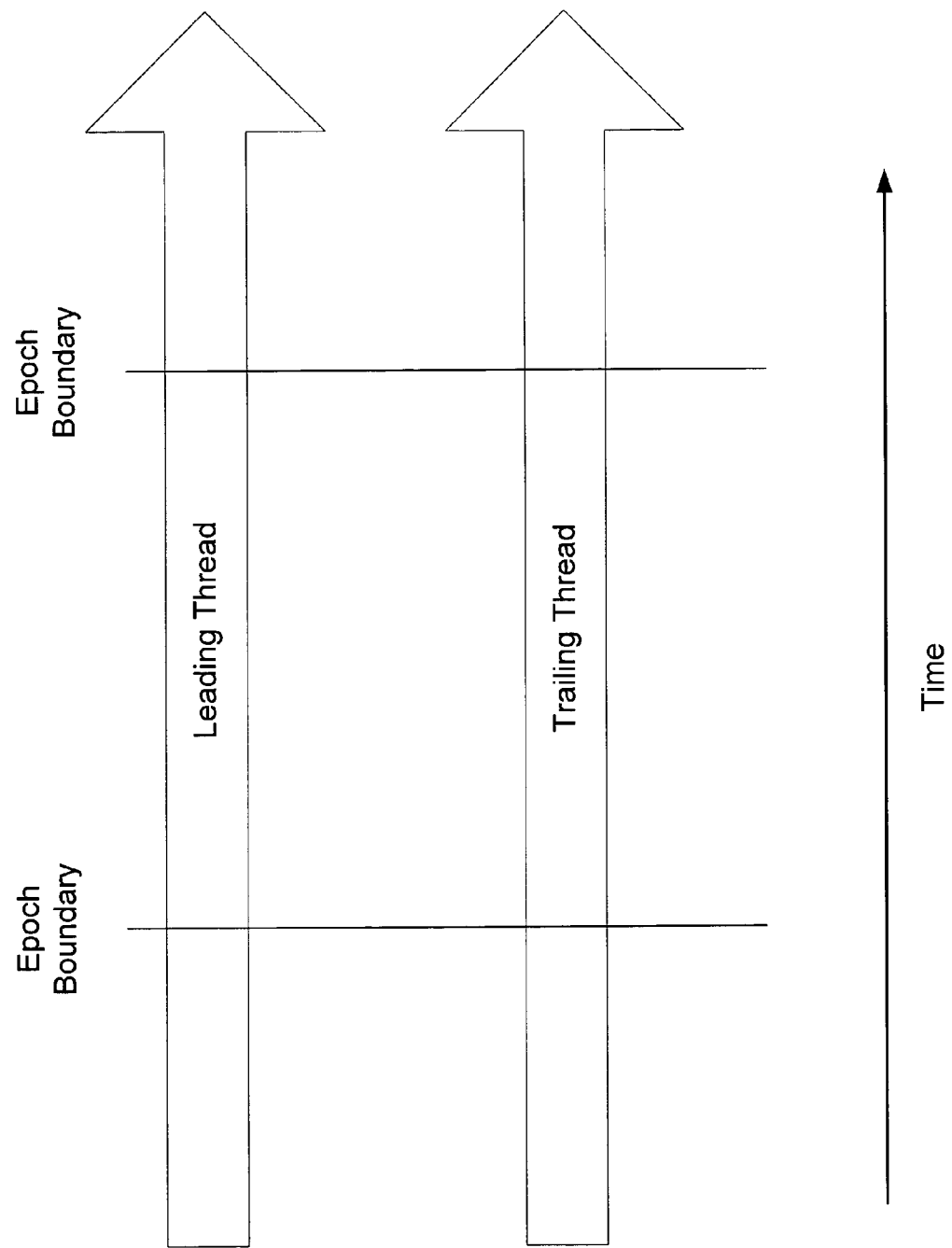
FIG. 6 is a conceptual illustration of epoch-based periodic checkpointing in a RMT architecture executing leading and trailing threads.

As described above, there exists in the multithreaded architecture one or more checker circuits that operate on store operations that send data outside of the sphere of replication. In one embodiment, in order to reuse checker circuits used for outputs from the sphere of replication, instruction execution is divided in to "epochs" at the conclusion of which a checkpoint is created. FIG. 6 is a conceptual illustration of epoch-based periodic checkpointing in a RMT architecture executing leading and trailing threads.

Figure 7:
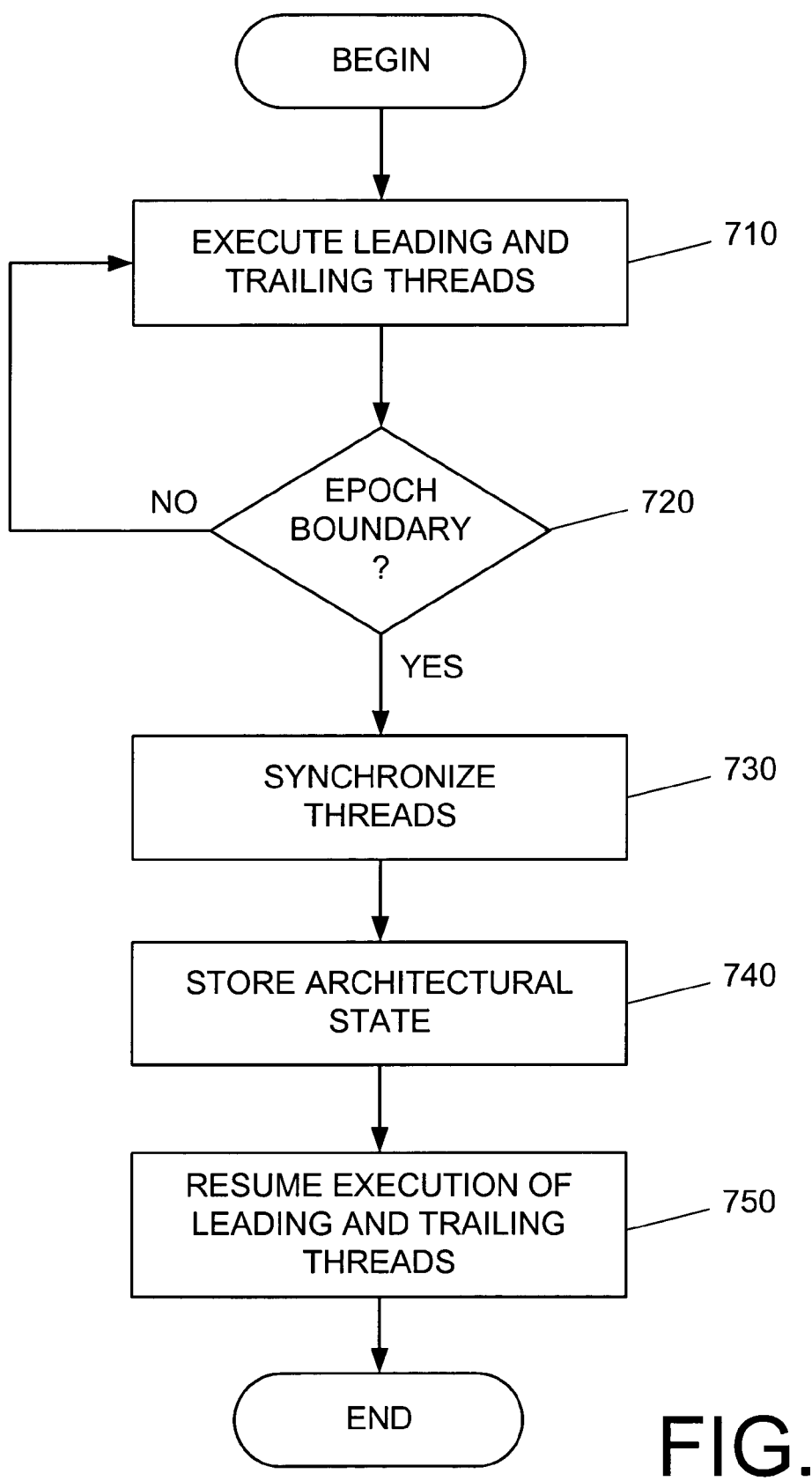
FIG. 7 is a flow diagram of one embodiment of creating a checkpoint at an epoch boundary.

FIG. 7 is a flow diagram of one embodiment of creating a checkpoint at an epoch boundary. In one embodiment, in each epoch, the redundant threads execute instructions, 710, and maintain the log as discussed above. At the end of the epoch (an epoch boundary as indicated by 720), the threads are synchronized, 730 to ensure that both threads have retired the same instructions.

In one embodiment, "pseudo-store" operations are then issued to store values stored in registers in the architectural register file to an external memory outside of the sphere of replication. The pseudo-store operations can be generated by firmware or hardware. In one embodiment, a pseudo-store operation is required for each register for which data is to be stored. The pseudo-store operations are processed by the fault detection mechanisms used for store operations. That is, the same circuitry used to check store operations during normal execution of the thread is used for checking the checkpoint data in response to a pseudo-store.

In the absence of faults, the checkpoint data are forwarded to the external checkpoint memory, which stores a protected copy of the architectural state of the processor, 740. Execution of both threads is then resumed. Thus, a dedicated checker for validation of checkpoint data before the data is committed to memory outside of the sphere of replication is not required.

During storage of checkpoint data, data corresponding to two checkpoints are maintained. Data corresponding to one checkpoint is stored in the external memory and is therefore valid and stable. Data corresponding to the other checkpoint is the data being checked and stored. Thus, if checkpoint creation causes a fault, the architecture state from the valid and stable checkpoint data (the previous checkpoint) can be used for recovery. When checkpoint data is stored (corresponding to an epoch boundary) data corresponding to previous checkpoints can be discarded. Execution of the leading and trailing threads is then resumed, 750.

In one embodiment, the number of pseudo-stores required at the conclusion of each epoch can be reduced by not repeating checking of previously checked register values. For example, a store from the leading thread results in the comparison of both registers being carried (i.e., the address and the data) before the store operation exits the sphere of replication. These previously checked registers may not be required to be checked again.

In some instances a register value may be overwritten after the store check. For example, if a store to register R1 is followed by an add instruction that rewrites the value in register R1, the new value stored in R1 will not have been checked if the epoch boundary is too soon (e.g., immediately) after the new value is written to R1. If so, a pseudo-store operation should be issued to check the new register value.

In one embodiment, as stores are processed by the checker circuit the register values are forwarded to a checkpoint memory. The memory accumulates register values as the register values pass the fault detection point. A bit vector (or other indicator) is also maintained that indicates the status of the registers.

Figure 8:
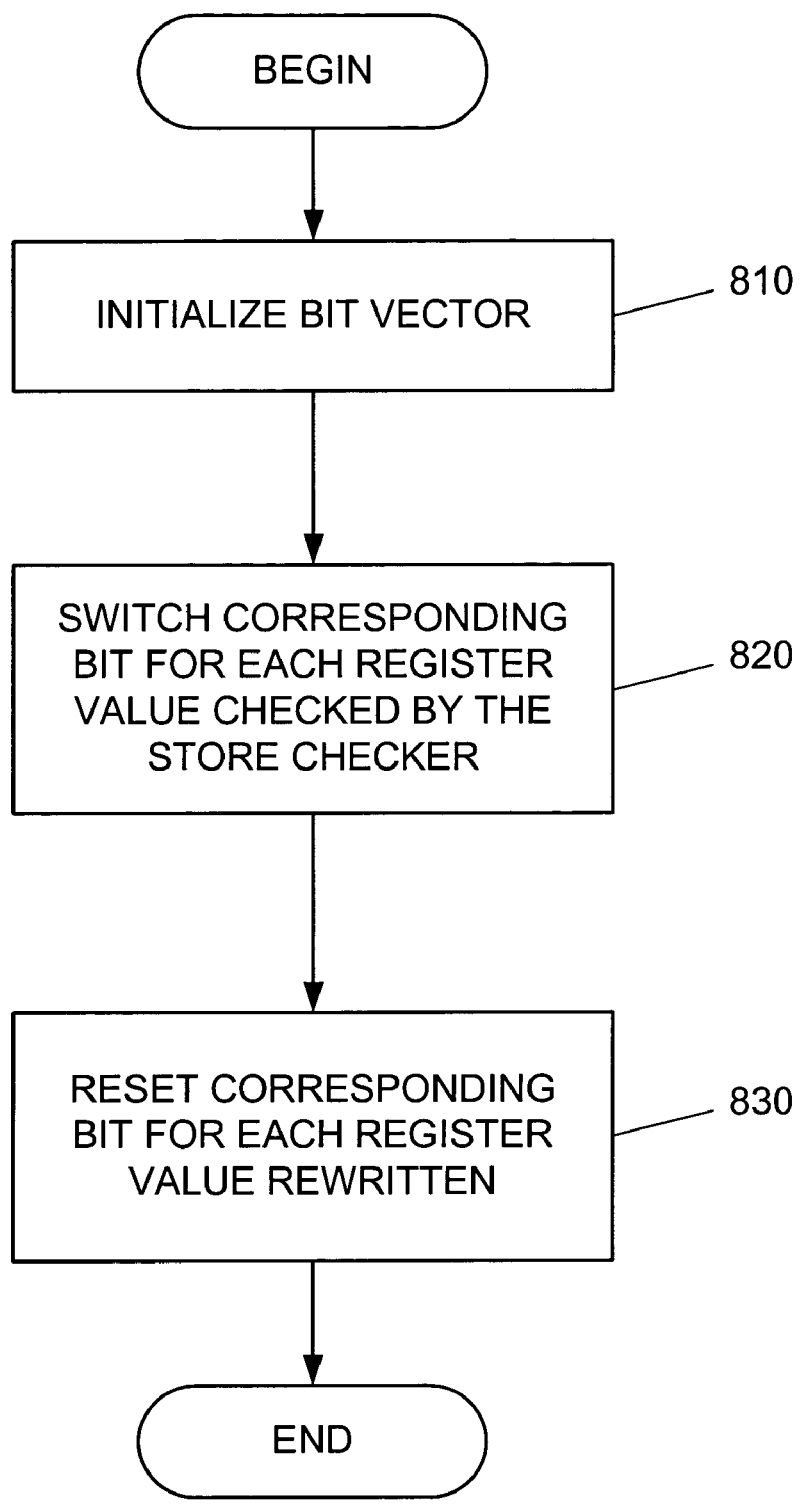
FIG. 8 is a flow diagram of one embodiment of maintaining a bit vector to be used on association with creation of a checkpoint at an epoch boundary.

FIG. 8 is a flow diagram of one embodiment of maintaining a bit vector to be used on association with creation of a checkpoint at an epoch boundary. In one embodiment, a bit vector has a bit corresponding to each architectural register.

Each bit in the bit vector is initialized to a predetermined value (e.g., either set or clear) at the beginning of an epoch, 810. When a register value passes the fault detection point, the corresponding bit in the bit vector is switched, 820. If a subsequent instruction rewrites the register, the corresponding bit in the bit vector is reset to the original value, 830. At the end of the epoch, pseudo-stores are issued for the registers that have corresponding bits in the bit vector in the original state. The bit vector can be maintained in either hardware or software.

Example of a System

FIG. 9 is a block diagram of an electronic system that can provide an environment for multithreaded processors. The electronic system illustrated in FIG. 9 is intended to represent a range of electronic systems. Alternative electronic systems can include more, fewer and/or different components.

Electronic system 900 includes bus 910 or other communication device to communicate information, and processor(s) 920 coupled to bus 910 to process information. Electronic system 900 further includes random access memory (RAM) or other dynamic memory as well as static memory, for example, a hard disk or other storage device 935 (referred to as memory), coupled to bus 910 via memory controller 930 to store information and instructions to be executed by processor(s) 920. Memory 935 also can be used to store temporary variables or other intermediate information during execution of instructions by processor(s) 920. Memory controller 930 can include one or more components to control one or more types of memory and/or associated memory devices. Electronic system 900 also includes read only memory (ROM) and/or other static storage device 940 coupled to bus 910 to store static information and instructions for processor(s) 920.

Electronic system 900 can also be coupled via bus 910 to input/output (I/O) interface 950. I/O interface 950 provides an interface to I/O devices 955, which can include, for example, a cathode ray tube (CRT) or liquid crystal display (LCD), to display information to a computer user, an alphanumeric input device including alphanumeric and other keys and/or a cursor control device, such as a mouse, a trackball, or cursor direction keys. Electronic system 900 further includes network interface 960 to provide access to a network, such as a local area network, whether wired or wireless.

Instructions are provided to memory 935 from a storage device, such as magnetic disk, a read-only memory (ROM) integrated circuit, CD-ROM, DVD, via a remote connection (e.g., over a network via network interface 960) that is either wired or wireless, etc. In alternative embodiments, hardwired circuitry can be used in place of or in combination with software instructions. Thus, execution of sequences of instructions is not limited to any specific combination of hardware circuitry and software instructions.

Conclusion

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A method comprising:
    executing a leading instruction thread and a corresponding trailing instruction thread;
    synchronizing execution of the leading instruction thread and the trailing instruction thread in response to occurrence of a set of one or more predetermined conditions;
    storing, in an external memory, values stored in one or more registers providing architectural state for a processor executing the leading instruction thread and/or the trailing instruction thread by maintaining an indication of registers storing values that have been checked for faults and/or registers storing values that have not been checked for faults and causing contents of the registers storing values that have not been checked for faults to be checked for faults and stored in external memory, wherein maintaining an indication of registers storing values that have been checked for faults and/or registers storing values that have not been checked for faults includes maintaining a bit vector having a bit corresponding to a set of registers, setting a bit in the bit vector to a first value if a value in a selected register has been checked for faults, and setting a bit in the bit vector to a second value if the value in the selected register has not been checked for faults; and
    checking the values stored in the one or more registers with a checking mechanism used for checking results of store operations during execution of the leading instruction thread and/or the trailing instruction thread.

2. The method of claim 1 further comprising resuming execution of the leading instruction thread and the trailing instruction thread.

3. The method of claim 1 wherein synchronizing execution of the leading instruction thread and the trailing instruction thread in response to occurrence of a set of one or more predetermined conditions comprises:
    halting execution of the leading instruction thread at a particular instruction; and
    halting execution of the trailing instruction thread at the particular instruction in response to an indication of the particular instruction from circuitry executing the leading instruction thread.

4. The method of claim 1 wherein the leading instruction thread and the trailing instruction thread are executed by a single processor.

5. The method of claim 1 wherein the leading instruction thread and the trailing instruction thread are executed by multiple processors.

6. The method of claim 1 wherein the one or more predetermined conditions comprises passage of a designated period of time.

7. The method of claim 1 wherein the one or more predetermined conditions comprises execution of a designated number of instructions.

8. The method of claim 1 wherein the one or more predetermined conditions comprises existence of one or more designated architectural state conditions.

9. An apparatus comprising:
    leading thread execution circuitry to execute a leading thread of instructions;
    trailing thread execution circuitry to execute a trailing thread of instructions;
    fault checking circuitry coupled with the leading thread execution circuitry and the trailing thread execution circuitry to check for faults by comparing outputs from corresponding store operations in the leading thread of instructions and the trailing thread of instructions, wherein in response to synchronization of the leading thread of instructions and the trailing thread of instructions, the fault checking circuitry checks contents of one or more registers providing architectural state for the leading and/or trailing thread execution circuitry and having values not checked during execution of the leading thread of instructions and the trailing thread of instructions; and
    a memory to store an indication of registers storing values that have been checked for faults and/or registers storing values that have not been checked for faults the memory having a register and the indication including a bit vector having a bit corresponding to a register in a processor register file.

10. The apparatus of claim 9 further comprising a memory coupled with the leading thread execution circuitry, the trailing thread execution circuitry and the fault checking circuitry to store the values in the registers checked in response to synchronization of the leading thread of instructions and the trailing thread of instructions.

11. The apparatus of claim 9 wherein the leading thread execution circuitry and the trailing thread execution circuitry comprise a single processor.

12. The apparatus of claim 9 wherein the leading thread execution circuitry comprises a first processor and the trailing thread execution circuitry comprises a second processor.

13. An apparatus comprising:
means for executing a leading instruction thread and a corresponding trailing instruction thread;
means for synchronizing execution of the leading instruction thread and the trailing instruction thread in response to occurrence of a set of one or more predetermined conditions;
means for storing, in an external memory, values stored in one or more registers providing architectural state for a processor executing the leading instruction thread and/or the trailing instruction thread, including:
means for maintaining an indication of registers storing values that have been checked for faults and/or registers storing values that have not been checked for faults including means for maintaining a bit vector having a bit corresponding to a set of registers, means for setting a bit in the bit vector to a first value if a value in a selected register has been checked for faults and means for setting a bit in the bit vector to a second value if the value in the selected register has not been checked for faults,
means for causing contents of the registers storing values that have not been checked for faults to be checked for faults and stored in external memory; and
means for checking the values stored in the one or more registers with a checking mechanism used for checking results of store operations during execution of the leading instruction thread and/or the trailing instruction thread.

14. The apparatus of claim 13 further comprising means for resuming execution of the leading instruction thread and the trailing instruction thread.

15. The apparatus of claim 13 wherein the means for synchronizing execution of the leading instruction thread and the trailing instruction thread in response to occurrence of a set of one or more predetermined conditions comprises:
means for halting execution of the leading instruction thread at a particular instruction; and
means for halting execution of the trailing instruction thread at the particular instruction in response to an indication of the particular instruction from circuitry executing the leading instruction thread.

16. A method comprising:
maintaining a bit vector having a bit corresponding to a set of registers;
setting a bit in the bit vector to a first value if a value in a selected register has been checked for faults;
setting a bit in the bit vector to a second value if the value in the selected register has not been checked for faults;
executing a leading instruction thread and a corresponding trailing instruction thread;
synchronizing execution of the leading instruction thread and the trailing instruction thread in response to occurrence of a set of one or more predetermined conditions;
storing, in an external memory, values stored in one or more registers providing architectural state for a processor executing the leading instruction thread and/or the trailing instruction thread, as designated by the bit vector; and
checking the values stored in the one or more registers with a checking mechanism used for checking results of store operations during execution of the leading instruction thread and/or the trailing instruction thread.

17. The method of claim 16 wherein the leading instruction thread and the trailing instruction thread are executed by a single processor.

18. The method of claim 16 wherein the leading instruction thread and the trailing instruction thread are executed by multiple processors.

19. The method of claim 16 wherein the one or more predetermined conditions comprises passage of a designated period of time.

20. The method of claim 16 wherein the one or more predetermined conditions comprises execution of a designated number of instructions.

21. The method of claim 16 wherein the one or more predetermined conditions comprises existence of one or more designated architectural state conditions.

22. An apparatus comprising:
means for maintaining a bit vector having a bit corresponding to a set of registers;
means for setting a bit in the bit vector to a first value if a value in a selected register has been checked for faults;
means for setting a bit in the bit vector to a second value if the value in the selected register has not been checked for faults
means for executing a leading instruction thread and a corresponding trailing instruction thread;
means for synchronizing execution of the leading instruction thread and the trailing instruction thread in response to occurrence of a set of one or more predetermined conditions;
means for storing, in an external memory, values stored in one or more registers providing architectural state for a processor executing the leading instruction thread and/or the trailing instruction thread, as designated by the bit vector; and
means for checking the values stored in the one or more registers with a checking mechanism used for checking results of store operations during execution of the leading instruction thread and/or the trailing instruction thread.

23. The apparatus of claim 22 further comprising means for resuming execution of the leading instruction thread and the trailing instruction thread.

24. An apparatus comprising:
leading thread execution circuitry to execute a leading thread of instructions;
trailing thread execution circuitry to execute a trailing thread of instructions; and
a memory coupled with the leading thread execution circuitry and the trailing thread execution circuitry to store an indication of registers storing values that have been checked for faults and/or registers storing values that have not been checked for faults.

25. The apparatus of claim 24 further comprising fault checking circuitry coupled with the leading thread execution circuitry and the trailing thread execution circuitry to check for faults by comparing outputs from corresponding store operations in the leading thread of instructions and the trailing thread of instructions, wherein in response to synchronization of the leading thread of instructions and the trailing thread of instructions, the fault checking circuitry checks contents of one or more registers having values not checked during execution of the leading thread of instructions and the trailing thread of instructions based on the indication of registers storing values that have been checked for faults and/or registers storing values that have not been checked for faults.

26. The apparatus of claim 24 wherein the indication of registers storing values that have been checked for faults and/or registers storing values that have not been checked for faults comprises a bit vector having one or more bits corresponding to one or more registers in a processor.

27. The apparatus of claim 24 wherein the leading thread execution circuitry and the trailing thread execution circuitry comprise a single processor.

28. The apparatus of claim 24 wherein the leading thread execution circuitry and the trailing thread execution circuitry comprise multiple processors.

29. A system comprising:
leading thread execution circuitry to execute a leading thread of instructions;
trailing thread execution circuitry to execute a trailing thread of instructions;
an input/output controller coupled with the leading thread execution circuitry;
fault checking circuitry coupled with the leading thread execution circuitry and the trailing thread execution circuitry to check for faults by comparing outputs from corresponding store operations in the leading thread of instructions and the trailing thread of instructions, wherein in response to synchronization of the leading thread of instructions and the trailing thread of instructions, the fault checking circuitry checks contents of one or more registers providing architectural state for the leading and/or trailing thread execution circuitry and having values not checked during execution of the leading thread of instructions and the trailing thread of instructions; and
a memory to store an indication of registers storing values that have been checked for faults and/or registers storing values that have not been checked for faults the memory having a register and the indication including a bit vector having a bit corresponding to a register in a processor register file.

30. The system of claim 29 further comprising a memory coupled with the leading thread execution circuitry, the trailing thread execution circuitry and the fault checking circuitry to store the values in the registers checked in response to synchronization of the leading thread of instructions and the trailing thread of instructions.

31. The system of claim 29 wherein the leading thread execution circuitry and the trailing thread execution circuitry comprise a single processor.

32. The system of claim 29 wherein the leading thread execution circuitry comprises a first processor and the trailing thread execution circuitry comprises a second processor.

33. A system comprising:
leading thread execution circuitry to execute a leading thread of instructions;
trailing thread execution circuitry to execute a trailing thread of instructions;
an input/output controller coupled with the leading thread execution circuitry; and
a memory coupled with the leading thread execution circuitry and the trailing thread execution circuitry to store an indication of registers storing values that have been checked for faults and/or registers storing values that have not been checked for faults.

34. The system of claim 33 further comprising fault checking circuitry coupled with the leading thread execution circuitry and the trailing thread execution circuitry to check for faults by comparing outputs from corresponding store operations in the leading thread of instructions and the trailing thread of instructions, wherein in response to synchronization of the leading thread of instructions and the trailing thread of instructions, the fault checking circuitry checks contents of one or more registers having values not checked during execution of the leading thread of instructions and the trailing thread of instructions based on the indication of registers storing values that have been checked for faults and/or registers storing values that have not been checked for faults.

35. The system of claim 33 wherein the indication of registers storing values that have been checked for faults and/or registers storing values that have not been checked for faults comprises a bit vector having one or more bits corresponding to one or more registers in a processor.

36. The system of claim 33 wherein the leading thread execution circuitry and the trailing thread execution circuitry comprise a single processor.

37. The system of claim 33 wherein the leading thread execution circuitry and the trailing thread execution circuitry comprise multiple processors.

38. A method comprising:
executing a leading instruction thread and a corresponding trailing instruction thread;
synchronizing execution of the leading instruction thread and the trailing instruction thread in response to occurrence of a set of one or more predetermined conditions;
storing checkpoint data corresponding to the synchronization of the leading instruction thread and the trailing instruction thread in an external memory, the checkpoint data containing at least the architectural state for a processor executing the leading instruction thread and/or the trailing instruction thread by maintaining an indication of registers storing values that have been checked for faults and/or registers storing values that have not been checked for faults by maintaining a bit vector having a bit corresponding to a set of registers, setting a bit in the bit vector to a first value if a value in a selected register has been checked for faults and setting a bit in the bit vector to a second value if the value in the selected register has not been checked for faults, and causing contents of the registers storing values that have not been checked for faults to be checked for faults and stored in the external memory; and
checking the checkpoint data with a checking mechanism used for checking results of store operations during execution of the leading instruction thread and/or the trailing instruction thread.

39. The method of claim 38 wherein the leading instruction thread and the trailing instruction thread are executed by a single processor.

40. The method of claim 38 wherein the leading instruction thread and the trailing instruction thread are executed by multiple processors.

* * * * *